(12) United States Patent
Rapp et al.

(10) Patent No.: US 7,794,764 B2
(45) Date of Patent: *Sep. 14, 2010

(54) PRESERVATION OF PROCESS SENSITIVE INGREDIENTS IN AN ENERGY FOOD PRODUCT BY PRODUCT PARTITIONING

(75) Inventors: Edward L. Rapp, Blairstown, NJ (US); Ralph Lee, Hampton, NJ (US); Jamie Troy, Columbia, NJ (US); Jeannette Dido, Hoboken, NJ (US); Douglas Mann, Belvidere, NJ (US); Thomas Collins, Nazareth, PA (US); Kevin Rabinovitch, Hackettstown, NJ (US)

(73) Assignee: Mars Incorporated, McLean, VA (US)

( * ) Notice: Subject to any disclaimer, the term of this patent is extended or adjusted under 35 U.S.C. 154(b) by 1408 days.

This patent is subject to a terminal disclaimer.

(21) Appl. No.: 10/271,710

(22) Filed: Oct. 15, 2002

(65) Prior Publication Data
US 2004/0071826 A1    Apr. 15, 2004

(51) Int. Cl.
*A23L 1/29* (2006.01)
(52) U.S. Cl. ............ 426/72; 426/74; 426/102; 426/519; 426/549; 426/618; 426/810
(58) Field of Classification Search .......... 426/102, 426/72, 74, 549, 618, 519, 810
See application file for complete search history.

(56) References Cited

U.S. PATENT DOCUMENTS

| | | | | |
|---|---|---|---|---|
| 3,917,861 | A | 11/1975 | Viera et al. ............ 426/274 |
| 3,950,545 | A * | 4/1976 | Hayward et al. ............ 426/72 |
| 4,055,669 | A | 10/1977 | Kelly et al. ............ 426/93 |
| 4,859,475 | A | 8/1989 | Michnowski ............ 426/72 |
| 5,075,121 | A | 12/1991 | Desage et al. ............ 426/233 |
| 5,079,012 | A | 1/1992 | Lengerich et al. ............ 426/72 |
| 5,153,177 | A | 10/1992 | Chaundy et al. ............ 514/21 |
| 5,229,147 | A | 7/1993 | Kubota et al. ............ 426/2 |
| 5,356,636 | A | 10/1994 | Schneider et al. ............ 424/489 |
| 6,139,872 | A | 10/2000 | Walsh ............ 424/464 |
| 6,200,611 | B1 | 3/2001 | Ganesan et al. ............ 426/93 |
| 6,378,795 | B1 | 4/2002 | Kelly et al. ............ 241/223 |
| 6,592,915 | B1 * | 7/2003 | Froseth et al. ............ 426/93 |
| 2002/0015765 | A1 | 2/2002 | Wu ............ 426/94 |
| 2002/0094359 | A1 | 7/2002 | Prosise et al. ............ 426/72 |

FOREIGN PATENT DOCUMENTS

| | | |
|---|---|---|
| EP | 1 323 355 A1 | 7/2003 |
| GB | 2 087 788 A | 3/1982 |
| WO | WO 00 42867 | 7/2000 |
| WO | WO 02 21937 A2 | 3/2002 |

OTHER PUBLICATIONS

Ridderbusch, G., "Forming of Coated and Uncoated Cereal Bars," Confectionery Production, Dec. 1985, pp. 686-690.

* cited by examiner

*Primary Examiner*—Helen F Pratt
(74) *Attorney, Agent, or Firm*—Fitzpatrick, Cella, Harper & Scinto

(57) ABSTRACT

A process for preparing an energy food product comprising the steps of (a) processing at least one base energy food component at a temperature and shear sufficient to form a homogeneous base energy food matrix; and (b) subsequently mixing at least one process sensitive component with said homogeneous base energy food matrix at a temperature and shear that does not deleteriously effect said process sensitive component.

6 Claims, No Drawings

PRESERVATION OF PROCESS SENSITIVE INGREDIENTS IN AN ENERGY FOOD PRODUCT BY PRODUCT PARTITIONING

BACKGROUND OF THE INVENTION

1. Field of the Invention

The present invention is directed to a method of preparing an energy food product having at least one process sensitive ingredient. The base energy food components are processed at a temperature and shear sufficient to form a homogeneous base energy food matrix. Subsequently, at least one process sensitive component is mixed with the homogeneous base energy food matrix at a temperature and shear that does not deleteriously effect the process sensitive component.

2. Related Background Art

Food products that identify themselves as energy food products are gaining in popularity among all consumers. The thought of eating a nutritious food product that is shelf stable and packaged in a portable form is appealing to most people, especially individuals who feel they need a functional benefit from the nutrients offered by such products. Other products, such as for example, granola bars and fruit snacks have gained in popularity by offering consumers natural food ingredients that are perceived to be nutritious.

However, the energy food products that are currently marketed are typically bars formed from a homogeneous mass of a mixture. These products do not appeal to many consumers, who prefer a more food like format. Moreover, the homogeneity of the bar/extruded mass provides for a product that has a singular taste. A more appealing alternative is needed to provide consumers with the nutritional or functional benefits they seek in a format that consumers find desirable with sensory variation and variety.

SUMMARY OF THE INVENTION

A process for preparing an energy food product comprising the steps of (a) processing at least one base energy food component at a temperature and shear sufficient to form a homogeneous base energy food matrix; and (b) subsequently mixing at least one process sensitive component with said homogeneous base energy food matrix at a temperature and shear that does not deleteriously effect said process sensitive component.

DETAILED DESCRIPTION OF THE INVENTION

The energy food product of the present invention is processed in a manner such that process sensitive components are not deleteriously effected.

For the purposes of the present invention, energy food products are food products that are shelf stable, in a portable form, and based on a 55 g serving size provides about 2 to about 55 g of carbohydrates, about 1 to about 5 g of fortification components (e.g., vitamins, minerals, antioxidants, herbs, etc.), about 5 to about 40 g of protein, about 2 to about 8 g of fat, about 170 to about 300 calories, and has a moisture content of at least about 3% by weight.

The present invention provides a process for preparing an energy food product, which contains at least one process sensitive component. Applicants have discovered that by controlling the temperature and shear energy imparted on a process sensitive component, harmful and deleterious effects on the process sensitive component can be reduced or minimized.

A homogeneous base energy food matrix is formed by processing one or more base energy food components. Typically, shearing forces, which tear and break apart pieces are applied to the base energy food components to form a homogeneous mass.

The processing step is performed at a temperature and shear sufficient to form the homogeneous base energy food matrix. Typically, the processing step is performed at a temperature from about 50° C. to about 180° C. Preferably, from about 60° C. to about 120° C., and more preferably, from about 60° C. to about 100° C.

Shear forces originating from mixing, extruding, pumping, cutting, particle size reduction operations, and the like, may be used to form the homogeneous base energy food matrix. The shear forces are preferably generated during a mixing operation. The mixer should have an agitator, where the agitator is capable of generating an agitator tip speed (relative to a wall of the mixer) of about 10 to about 50 meters/minute. In a preferred embodiment, the agitator tip speed is about 20 to about 40 meters/minute. Consideration should also be given to the gap formed between the agitator tip to the mixer wall. The gap should be from about 0.025 to about 0.5 mm. Preferably from about 0.125 to about 0.25 mm.

Additional shear forces may be encountered by transporting the in process product through process piping, valves, strainers, filters, and the like.

The process sensitive components, include, but are not limited to, a fortification component, a friable component, a flavor component, a shear sensitive inclusion component, and the like. Vitamins, minerals, antioxidants, essential oils, herbals, and polyphenols are non-limiting examples of the fortification component. Friable and shear sensitive components include, but are not limited to, soy crisps, rice crisps, cookies, nut meats, baked inclusions, fried inclusions, roasted inclusions, extruded food inclusions, encapsulated components, and the like. Flavor components are, for example, vanilla, butter, cinnamon, nutmeg, spices, whole grains, grain flakes, natural and artificial flavors, and the like.

The product design will ultimately dictate the amount of the process sensitive components that will be included in the energy food product of the present invention. As a guideline, about 1 wt. % to about 70 wt. %, preferably about 3 wt. % to about 60 wt. %, and most preferably about 5 wt. % to about 50 wt. %, of the process sensitive components will be present in the energy food product, based on the total weight of the energy food product.

To incorporate the process sensitive component into the homogeneous base energy food matrix requires mixing. The mixing device should be selected such that the shearing action imparted on the process sensitive component is sufficient to mix the process sensitive component into the homogeneous base matrix without affecting the process sensitive component in a deleterious way. Suitable mixers include, but are not limited to, mixers with an agitator, mixers without an agitator, static mixers, paddle blenders, ribbon blenders, and the like. When mixing is performed in a mixer with an agitator, shear forces are usually minimized by operating the agitator at a low speed, such that the tip speed of the agitator is about 0.25 to about 7.5 meters/minute (relative to a wall of the mixer). Preferably, the agitator tip speed is about 2 to about 6 meters/minute. Shear forces are also influenced by the gap between the tip of the agitator and the mixer wall. The gap is desirably set to be greater than about 1.0 mm, preferably, greater than about 2.5 mm, and more preferably, between about 2.5 to about 75 mm.

In one particular embodiment, mixing is performed in a continuous fashion.

The temperature of the mixing step can also have an effect on the process sensitive component. Generally, in order to substantially reduce deleterious effects, mixing should be performed at a temperature that is less than about 80° C. Preferably, the temperature is less than about 65° C., and more preferably, less than about 50° C. In one embodiment, the mixing step is performed at a temperature of from about 30° C. to about 50° C.

The base energy food components are comprised of a binder and a food component. The food components in the energy food components may be, for example, protein, starch, cocoa powder, grains, cereals, rice, nuts, nut meat flour, sugars, fruit inclusions, chocolate pieces, vegetable inclusions, and the like.

Protein is a nutritional supplement that is frequently included as a food component. It functions as a nutrient that helps with the growth and repair of body tissues. For adults, many dietary guidelines recommend that a person consume approximately 0.6 g of protein per kilogram of body weight per day. Higher levels are recommended for individuals that are more physically active. In addition, protein can be used as a source of energy. One gram of protein provides about 4 kcal of energy. Suitable protein sources include, but are not limited to, soy protein, milk protein, egg protein, peanut flour, nut meats, and combinations thereof.

Starch is another food component that is frequently included. It is classified as a carbohydrate, which serves as a source of energy for the body and is also used as a bulking component. The starch may be, for example, corn starch, oat, rice, corn, wheat, barley, sorghum, and the like.

Other bulking components include, but are not limited to, salt, sugar, nut meat flour, protein, cocoa powder, flavor components, and the like.

The food component is present in an amount of from about 25 wt. % to about 95 wt. % based on the total weight of the energy food product. Preferably, the food component is from about 35 wt. % to about 75 wt. % of the total weight of the energy food product.

The other essential component in the base energy food component is a binder. The binder aids in increasing the tackiness and/or stickiness of the food component, so that the food component will adhere to other similar or dissimilar components, when necessary. Suitable binders include, but are not limited to, sugar syrup, corn syrup, fat, a hydrocolloid solution, water, and combinations thereof.

The hydrocolloid solution may be made of carageneen, guar, xanthum, pectin, casein, cellulose, protein, and the like.

The binder makes up from about 5 wt. % to about 75 wt. % of the energy food product based on the total weight of the energy food product. Preferably, the binder is from about 25 wt. % to about 65 wt. % of the total weight of the energy food product.

Optionally, additional components may be included in order to provide an organoleptically acceptable final energy food product for consumption. For example, natural and artificial flavors, sweeteners, fruits, salt, flavor enhancers, color additives, emulsifiers, stabilizers, fats, preservatives, and the like, may be included in the energy food product.

The energy food product of the present invention has from about 20 wt. % to about 100 wt. % of the base energy food components based on the total weight of the energy food product. In a preferred embodiment, there is about 20 wt. % to about 75 wt. % of the base energy food components and in a more preferred embodiment, there is about 25 wt. % to about 60 wt. % of the base energy food components.

Optionally, the energy food product may include ingredients such as, for example, fruit gels, fruit pastes, caramel, icings, colorings, flavors, and the like. These ingredients may be present in the energy food product in an amount from about 0 wt. % to about 30 wt. %.

EXAMPLE 1

TABLE 1

Pre Blend Mixture
Ingredient

Corn Syrup Blend

Consisting of one or more ingredients selected from the list of:
High Fructose, Corn Syrup, Honey and 63 DE corn syrup
Protein Blend Consisting of one or more ingredients selected from the list of:
Vegetable or Animal Protein, Whey Protein Isolate, Calcium Caseinate, Soy Protein Isolate and peanut flour or their derivatives
Salt
Flavorings Artificial and/or Natural flavors such as vanillin, cinnamon and cocoa powder

TABLE 2

Fortification Slurry

| Ingredient | Percent by Weight |
|---|---|
| Glycerin | 17.7 |
| Fortification Blend | 32.4 |
| Corn Syrup | 49.9 |
| | 100.0 |

TABLE 3

| Component | Percent by Weight |
|---|---|
| Pre Blend Mixture | 69.3 |
| Fortification Slurry | 20.7 |
| Soy Crisps | 10.0 |
| | 100.0 |

The ingredients as set forth in Table 1 were processed in a Teledyne Readco Continuous processor to produce a Pre Blend Mixture. All ingredients were metered simultaneously to the infeed throat of the processor. The processor was equipped with feed screws at the inlet followed by forward helical mixing elements for the remaining length. The speed of the mixing elements was about 60 RPM with a resulting tip speed of about 10 meters/min. The tip to wall clearance was about 0.25 mm.

The corn syrup blend was heated and maintained at 65° C. prior to metering into the processor. The processor was equipped with a jacket maintained at 60° C. The residence time in the processor was approximately 1 minute. The shear imparted in the processor was sufficient to produce a homogeneous mixture. That mixture had a final temperature upon exiting the processor of 60° C. The Pre Blend Mixture was delivered directly to a Scott paddle blender. The ingredients as set forth in Table 2, the Fortification Slurry, and soy crisps were metered to the paddle blender with the Pre Blend Mixture in the ratio as set forth in Table 3. The Pre Blend Mixture, the soy crisps and Fortification Slurry were blended together in the paddle blender continuously. The paddle blender had an agitator speed of about 5 RPM, a tip speed of about 2 meters/min and an agitator tip to wall clearance of about 10 mm. The blended product exiting the blender had a temperature of about 55° C. The soy crisps were intact with minimal degradation and the fortification blend was not subjected to temperatures above 60° C. Temperatures above 60° C. cause degradation of the Fortification Blend. The resulting product was subsequently processed into a slab 4 mm high. The slab was then cut into finished pieces about 100 mm long by 38 mm wide.

EXAMPLE 2

The product as produced in Example 1 with the following modification. The Pre Blend Mixture Processor is operated with the jacket temperature at 100° C. to develop flavors from Maillard Browning. The Pre-Blend Mixture is allowed to cool actively, as in a cooling tunnel, or passively, on an ambient conveyor, to a temperature below 60° C. prior to being added to the paddle blender. The Fortification Blend is not subject to temperatures above 60° C. Temperatures above 60° C. cause degradation of the Fortification Blend. The soy crisps are intact with minimal degradation as in Example 1.

EXAMPLE 3

The product as produced in Example 1 with the following modification. The final blending is accomplished in a batch mixer, rather than a continuous mixer. The Paddle blender speed and wall gap is similar to that described in Example 1. The final product is discharged from the paddle blender as a batch for subsequent processing. The blended product exiting the batch blender has a temperature of about 55° C. The soy crisps are intact with minimal degradation and the fortification blend is not subject to temperatures about 60° C. Temperatures above 60° C. cause degradation of the Fortification Blend.

EXAMPLE 4

The Pre Blend Mixture as set forth in Table 1 is prepared in a batch mixer with a variable speed agitator. The Pre Blend Mixture is processed with an agitator tip speed of 40 meters/min. The jacket of the mixer is maintained at 60° C. during mixing. At the conclusion of mixing, the agitator is slowed to a tip speed of 2 meters/min and the jacket is cooled to 40° C. When the batch is sufficiently cooled, the Fortification Slurry, as set forth in Table 2, and the soy crisps are added to the mixer in the ratio as set forth in Table 3. The mixer is operated only as long as necessary to produce a good blend of the soy crisps and provide incorporation on the Fortification Slurry. The soy crisp integrity is maintained and the mass temperature does not exceed 60° C. Temperatures above 60° C. cause degradation to the Fortification Blend.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A process for preparing an energy food product comprising the steps of:

(a) processing at least one base energy food component at a temperature and shear sufficient to form a homogeneous base energy food matrix; and (b) subsequently mixing at least one fortification component with said homogeneous base energy food matrix at a temperature that is less than 80° C. and with a shear rate from mixing performed in a mixer sufficient to mix said fortification component into said homogeneous base matrix without deleteriously effecting said fortification component, wherein said energy food product has about 2 to about 55 g of carbohydrates, about 1 to about 5 g of fortification components, about 5 to about 40 g of protein, about 2 to about 8 g of fat, and about 170 to about 300 calories, based on a 55 g serving size, and wherein said at least one base energy food component is comprised of a binder and a food component, said binder selected from the group consisting of sugar syrup, corn syrup, fat, a gum solution, water, and mixtures thereof, and said food component selected from the group consisting of protein, starch, cocoa powder, and mixtures thereof, wherein said starch is selected from the group consisting of corn starch, oat, rice, corn, wheat, barley, sorghum, and mixtures thereof.

2. A process for preparing an energy food product comprising the steps of:

(a) processing at least one base energy food component at a temperature and shear sufficient to form a homogeneous base energy food matrix; and (b) subsequently mixing at least one fortification component with said homogeneous base energy food matrix at a temperature that is less than 80° C. and with a shear rate from mixing performed in a mixer sufficient to mix said fortification component into said homogeneous base matrix without deleteriously effecting said fortification component, wherein said energy food product has about 2 to about 55 g of carbohydrates, about 1 to about 5 g of fortification components, about 5 to about 40 g of protein, about 2 to about 8 g of fat, and about 170 to about 300 calories, based on a 55 g serving size, and wherein said at least one base energy food component is comprised of a binder and a food component, said binder selected from the group consisting of sugar syrup, corn syrup, fat, a gum solution, water, and mixtures thereof, and said food component selected from the group consisting of protein, starch, cocoa powder, and mixtures thereof, wherein said shear in said processing step is from mixing performed in a mixer having an agitator with an agitator tip speed relative to a wall of the mixer of about 10 to about 50 meters/minute and an agitator tip to mixer wall gap of from about 0.025 to about 0.5 mm.

3. The process according to claim 2, wherein said agitator tip speed is about 20 to about 40 meters/minute and an agitator tip to mixer wall gap of from about 0.125 to about 0.25 mm.

4. A process for preparing an energy food product comprising the steps of:

(a) processing at least one base energy food component at a temperature and shear sufficient to form a homogeneous base energy food matrix; and (b) subsequently mixing at least one fortification component with said homogeneous base energy food matrix at a temperature that is less than 80° C. and with a shear rate from mixing performed in a mixer sufficient to mix said fortification component into said homogeneous base matrix without deleteriously effecting said fortification component, wherein said energy food product has about 2 to about 55 g of carbohydrates, about 1 to about 5 g of fortification components, about 5 to about 40 g of protein, about 2 to about 8 g of fat, and about 170 to about 300 calories, based on a 55 g serving size, and wherein said at least one base energy food component is comprised of a binder and a food component, said binder selected from the group consisting of sugar syrup, corn syrup, fat, a gum solution, water, and mixtures thereof, and said food component selected from the group consisting of protein, starch, cocoa powder, and mixtures thereof, wherein said shear in said mixing step is from mixing performed in a mixer selected from the group consisting of a paddle mixer and a ribbon blender, wherein the mixer has an agitator with an agitator tip speed relative to a wall of the mixer of about 0.25 to about 7.5 meters/minute and an agitator tip to mixer wall gap greater than about 1.0 mm.

5. The process according to claim 4, wherein said agitator tip speed is about 2 to about 6 meters/minute and the agitator tip to mixer wall gap is greater than about 2.5 mm.

6. The process according to claim 5, wherein said agitator tip to mixer wall gap is from about 2.5 to about 75 mm.

* * * * *

UNITED STATES PATENT AND TRADEMARK OFFICE
CERTIFICATE OF CORRECTION

PATENT NO. : 7,794,764 B2  Page 1 of 1
APPLICATION NO. : 10/271710
DATED : September 14, 2010
INVENTOR(S) : Edward L. Rapp et al.

It is certified that error appears in the above-identified patent and that said Letters Patent is hereby corrected as shown below:

ON THE TITLE PAGE [57] ABSTRACT:

Line 7, "effect" should read --affect--.

COLUMN 1:

Line 15, "effect" should read --affect--;
Line 29, "food like" should read --foodlike--;
Line 44, "effect" should read --affect--; and
Line 51, "effected." should read --affected.--.

COLUMN 2:

Line 27, "components," should read --components--.

COLUMN 5:

Line 35, "about" should read --above--.

COLUMN 6:

Line 9, "effecting" should read --affecting--; and
Line 36, "effecting" should read --affecting--.

COLUMN 7:

Line 2, "effecting" should read --affecting--.

Signed and Sealed this
Eighteenth Day of January, 2011

David J. Kappos
*Director of the United States Patent and Trademark Office*